(12) United States Patent
Harada et al.

(10) Patent No.: US 6,616,878 B2
(45) Date of Patent: Sep. 9, 2003

(54) METHOD AND APPARATUS FOR BONDING EXTRUSION-MOLDED OR DIE-MOLDED PIECES

(75) Inventors: Fumio Harada, Hiroshima (JP); Kazuharu Konishi, Hiroshima (JP); Yoshihiro Masada, Hiroshima (JP); Toshio Nakaike, Hiroshima (JP)

(73) Assignee: Nishikawa Rubber Co., Ltd., Hiroshima (JP)

( * ) Notice: Subject to any disclaimer, the term of this patent is extended or adjusted under 35 U.S.C. 154(b) by 0 days.

(21) Appl. No.: 09/771,636

(22) Filed: Jan. 30, 2001

(65) Prior Publication Data

US 2002/0101002 A1 Aug. 1, 2002

(51) Int. Cl.[7] .......................... B29C 65/74; B29C 65/78
(52) U.S. Cl. .................... 264/163; 264/248; 156/304.2; 156/304.6; 156/245; 425/294; 425/311; 425/314; 425/510; 425/516
(58) Field of Search .................................. 264/163, 248, 264/249; 156/304.1, 304.2, 304.3, 304.4, 304.5, 304.6; 425/510, 516, 289, 292, 294, 310, 311, 314

(56) References Cited

U.S. PATENT DOCUMENTS 4,663,206 A * 5/1987 Bouyoucos et al. .......... 428/57
5,173,234 A * 12/1992 Figuereo ...................... 264/148
5,209,880 A * 5/1993 Miwa .......................... 264/23

FOREIGN PATENT DOCUMENTS

| JP | 63-064848 | * 3/1988 |
| JP | 07-314560 | * 12/1995 |

* cited by examiner

Primary Examiner—Stefan Staicovici
(74) Attorney, Agent, or Firm—Sughrue Mion, PLLC

(57) ABSTRACT

A method and apparatus for bonding molded pieces including left and right molds, a sheet material setting mechanism for inserting sheet material acting as a bonding medium between the left and right molds, a sliding blade portion that has a cutting blade disposed at a front end thereof for cutting the sheet material, the cutting blade being formed so as to be along outer circumferential surfaces of the molded pieces on a left side of the right mold and the sliding blade portion being movable to left and right inside the right mold, a driving mechanism for moving the sliding blade portion to left and right, a sliding blade bearing portion formed on a right side of the left mold such that the blade bearing portion and sliding blade bearing portion are movable to the left and right inside the left mold, and a spring member for pressing the sliding blade bearing portion to the right.

9 Claims, 11 Drawing Sheets

METHOD AND APPARATUS FOR BONDING EXTRUSION-MOLDED OR DIE-MOLDED PIECES

FIELD OF THE INVENTION

The present invention relates to a method for bonding extrusion-molded or die-molded pieces such as automotive weather strips, and an apparatus for bonding such molded pieces.

RELATED ART OF THE INVENTION

As a method in which two extrusion-molded pieces, such as automotive weather strips, having hollow portions with the same sectional shape, are bonded with each other while end portions of the molded pieces facing with each other are made to abut against each other, there is known a method as follows. That is, as disclosed in JP-A-7-314560, a thin bonding raw material the sectional shape of which substantially coincides with the shape of the end surface of each of a pair of extrusion-molded weather strips is pasted onto the end surface of one of the weather strips to be bonded with each other. Then, the end surface of the one weather strip is made to abut against the end surface of the other weather strip through the bonding raw material. And then, the two weather strips are set in a mold and both the end portions thereof to be bonded are vulcanized and bonded with each other.

It had been required to insert an inner core between hollow portions of two weather strips to be bonded to prevent a molding material from being injected into the hollow portions. According to the aforementioned method, however, such an inner core becomes unnecessary.

According to the bonding method disclosed in JP-A-7-314560, however, there is a problem that the work of bonding is troublesome because the shape of the thin bonding raw material is formed to substantially coincide with the shapes of the end surfaces of the weather strips to be bonded with each other.

Therefore, to take measures to solve this problem, the following bonding method can be considered. That is, in the method, a sheet material 1 as a bonding medium is interposed between hollow extrusion-molded pieces 2 and 3, and the sheet material 1 is cut along the shapes of the end surfaces of the extrusion-molded pieces 2 and 3 to be bonded by a cutting blade 7 and a blade bearing portion 8 formed in upper and lower molds 5 and 6 so that a surplus of the sheet material 1 is removed, as shown in FIGS. 22 and 23.

In more detail, each of the upper and lower molds 5 and 6 is designed so as to split to left and right molds. That is, the upper mold 5 is constituted by split molds 5A and 5B, while the lower mold 6 is constituted by split molds 6A and 6B. First, an abutment plate (not shown) is put as a partition between the left and right split molds 6A and 6B, and the extrusion-molded pieces 2 and 3 precisely cut in a direction perpendicular to their longitudinal axes are set on the lower molds 6A and 6B so that the end surfaces of the molded pieces 2 and 3 to be bonded are brought into contact with the abutment plate from left and right sides, respectively. Here, the extrusion-molded piece 2 is set on the lower mold 6A and the extrusion-molded piece 3 is set on the lower mold 6B in the same manner. The distance between the extrusion-molded pieces 2 and 3 is defined by the abutment plate.

Next, the upper molds 5 (5A and 5B) are moved down and the molds are closed so as to clamp the extrusion-molded pieces 2 and 3 from their top and bottom. Thus, the extrusion-molded pieces 2 and 3 are held firmly. Then, the upper and lower molds 5A and 6A holding the extrusion-molded piece 2 and the upper and lower molds 5B and 6B holding the extrusion-molded piece 3 are moved to left and right so as to leave each other, respectively. Subsequently, in place of the abutment plate, the sheet material 1 is inserted between the end surfaces 2a and 3a of the extrusion-molded pieces 2 and 3 to be bonded, respectively (see FIG. 22).

Next, the upper and lower molds 5A and 6A and the upper and lower molds 5B and 6B apart from each other are made close to each other, respectively, and the end surfaces 2a and 3a of the extrusion-molded pieces 2 and 3 to be bonded are made to abut against each other through the sheet material 1. As a result, the sheet material 1 is cut into a shape (in FIG. 23, a circular shape) corresponding to the shapes of the end surfaces of the extrusion-molded pieces 2 and 3 to be bonded by the cutting blade 7 and the blade bearing portion 8 formed in the upper and lower molds 5 and 6. Then, the sheet material 1 and the extrusion-molded pieces 2 and 3 are heat-vulcanized so as to be bonded with one another (see FIG. 23).

Upon completion of bonding, the upper and lower molds 5A and 6A and the upper and lower molds 5B and 6B are made to leave each other. Further, the upper molds 5A and 5B are made to come off from the lower molds 6A and 6B respectively, and the sheet material 1 and the extrusion-molded pieces 2 and 3 molded integrally are taken out from the molds, thus removing tailings of the cut sheet material 1.

Thus, the bonding of the extrusion-molded pieces 2 and 3 is completed.

However, the above-described method of cutting the sheet material 1 with the cutting blade 7 and the blade bearing portion 8 formed in the upper and lower molds 5 and 6, the portion to be cut cannot be cut perfectly so that a burr 9 is produced in the outer circumference of the sheet material 1 cut along the shapes of the end surfaces of the extrusion-molded pieces 2 and 3 to be bonded, as shown in FIG. 24. When such a burr 9 is formed, there is a problem that a water-stop seal function is blocked when the extrusion-molded pieces 2 and 3 integrated with each other are used as seal material such as an automotive weather strip or the like.

SUMMARY OF THE INVENTION

It is therefore an object of the present invention to provide a method and an apparatus for bonding two extrusion-molded pieces, two die-molded pieces, or one extrusion-molded pieces and one die-molded piece, in which no burr is produced in any portion where the molded pieces are bonded with each other, and which facilitate the bonding work.

Other objects and effects of the present invention will become apparent from the following description.

The above-described objects of the present invention have been achieved by providing the following methods and apparatus.

(1) A method for bonding molded pieces, comprising the steps of:
  providing a mold which can be split into left and right molds, said right mold having a cutting blade formed on a left side thereof so as to be along outer circumferential surfaces of the molded pieces, and said left mold having a blade bearing portion formed on a right side thereof for bearing said cutting blade;
  setting a pair of molded pieces having sectional shapes coincident with each other into said left and right molds, respectively, in such a manner that end surfaces of said molded pieces to be bonded are put inside so as to face each other, wherein said pair of molded pieces each individually being an extrusion-molded piece or a die-molded piece;

attaching said left and right split molds with each other while inserting a sheet material acting as a bonding medium therebetween, so that said end portions of said molded pieces to be bonded are brought into contact with each other via said sheet material, and that said sheet material is cut into a shape along the shape of said molded piece end surfaces by said cutting blade;

applying heat to at least a portion of said molded pieces to integrate with each other; and sliding at least one of said molds and said integrated molded article to move left or right.

(2) The method for bonding molded pieces according to item (1) above, wherein said mold, which can be split into left and right molds, can be further split into two or more molds in the vertical direction, and said sliding step is carried out by sliding at least each one of said vertically split molds of said left and right molds.

3. A method for bonding molded pieces, comprising the steps of:

providing a mold which can be split into left and right molds, said right mold having a cutting blade formed on a left side thereof so as to be along outer circumferential surfaces of the molded pieces, said left mold having a blade bearing portion formed on a right side thereof for bearing said cutting blade, and said cutting blade and said blade bearing portion being movable Left and right independently of said molds;

setting a pair of molded pieces having sectional shapes coincident with each other into said left and right molds, respectively, in such a manner that end surfaces of said molded pieces to be bonded are put inside so as to face each other, wherein said pair of molded pieces each individually being an extrusion-molded piece or a die-molded piece;

attaching said left and right split molds with each other while inserting a sheet material acting as a bonding medium therebetween, so that said end portions of said molded pieces to be bonded are brought into contact with each other via said sheet material, and that said sheet material is cut into a shape along the shape of said molded piece end surfaces by said cutting blade;

applying heat to at least a portion of said molded pieces to integrate with each other; and sliding said cutting blade and said blade bearing portion to move left.

(4) The method for bonding molded pieces according to item (3) above, wherein only a part of said cutting blade and said blade bearing portion each along the outer circumferential surfaces of said molded pieces is made movable.

(5) The method for bonding molded pieces according to any one of items (1) to (4) above, further comprising:

slightly releasing a clamping force of said molds with respect to said integrated molded article, prior to said sliding step; and tightening said molds after said sliding step.

(6) An apparatus for bonding molded pieces, comprising:

a mold which can be split into left and right molds adapted so that a pair of molded pieces to be bonded having sectional shapes coincident with each other can be respectively set therein with end surfaces of said molded pieces to be bonded being put inside so as to face each other;

a sheet material setting mechanism for inserting a sheet material acting as a bonding medium between said left and right molds;

a sliding blade portion which has a cutting blade disposed at a front end thereof for cutting said sheet material along shapes of end surfaces of said molded pieces to be bonded and set in said molds, said cutting blade being formed so as to be along outer circumferential surfaces of said molded pieces on a left side of said right mold, and said sliding blade portion being movable to left and right inside said right mold;

a driving mechanism for moving said sliding blade portion to left and right;

a sliding blade bearing portion which has a blade bearing portion at a front end thereof for bearing said cutting blade, said blade bearing portion being formed on a right side of said left mold so that said blade bearing portion, and said sliding blade bearing portion being movable to left and right inside said left mold; and a spring member for pressing said sliding blade bearing portion to right.

According to item (1) of the invention, two extrusion-molded pieces (which may be replaced by two die-molded pieces or a combination of an extrusion-molded piece and a die-molded piece) are set in left and right split molds, so that end surfaces of the molded pieces to be bonded face each other. The molded pieces are bonded integrally with each other through a sheet material which is to be cut by a cutting blade. Then, the integrated molded pieces or the integrated molds are slid and moved to left or right, respectively. Accordingly, any burr of the sheet material in the outer circumferential surfaces of the molded pieces produced when the integration before the sliding is leveled by plane portions of the molds.

Therefore, when the thus integrated molded article is used as a seal material such as an automotive weather strip or the like, there is no fear that a water-stop seal function is blocked. In addition, because any burr is leveled, the appearance of the molded pieces becomes excellent.

Further, the sheet material as a bonding medium is cut along the shapes of the end surfaces of the molded pieces to be bonded by the cutting blade when the molds are integrated with each other. Accordingly, it is not necessary to cut, in advance, the sheet material along the shapes of the end surfaces of the molded pieces to be bonded. Thus, the bonding workability is improved In addition, for example, when molded pieces each having a hollow portion are bonded with each other, it is not necessary to insert an inner core into hollow portions to be bonded with each other in order to prevent molding material from being injected into the hollow portions.

According to item (2) of the invention, in addition to the operation and effect of the invention stated in claim 1, the left and right split molds can be further split respectively into two, for example, vertically. Thus, by merely sliding and moving the upper mold of the left molds and the upper mold of the right molds, any burr can be removed not from the whole of the molded pieces but from only a required portion thereof. It is therefore possible to remove or level a burr in concentration from only a portion where a burr is apt to be produced.

Further according to items (3) and (6) of the invention, two molded pieces are set in left and right split molds, so that end surfaces of the molded pieces to be bonded face each other. The molded pieces are bonded integrally with each other through a sheet material which is to be cut by a cutting blade. Then, the cutting blade and blade bearing portion are slid and moved to left. Any burr of the sheet material on the outer circumferential surfaces of the molded pieces produced when the integration before the sliding is cut by the cutting blade similarly to item (1). In addition, the burr is leveled by a plane portion of the cutting blade.

Accordingly, in addition to an effect similar to that according to item (1) of the invention, an additional effect can be obtained as follows. Since a burr is cut by moving only the cutting blade and the blade bearing portion, if the cutting blade and the blade bearing portion are provided inside the molds as stated in item (6), the apparatus as a whole can be made compact to save a space.

Item (4) of the invention has the following feature in addition to the operation and effect of the invention stated in item (3). Only some part of the cutting blade and the cutting blade bearing portion formed along the outer circumferential surfaces of the molded pieces is movable. Accordingly, any burr can be removed not from the whole of the molded pieces but from only a required portion thereof. It is therefore possible to remove (level) a burr in concentration from only a portion where a burr is apt to be produced.

According to item (5) of the invention, the molds are released slightly from clamping the integrated molded pieces before sliding and moving in items (1) to (4) of the invention. Accordingly, the molded pieces, the molds or the cutting blade can be slid and moved smoothly. In addition, after such sliding and moving, the molds are closed again. Accordingly, any produced burr is leveled surely.

DETAILED DESCRIPTION OF THE PREFERRED EMBODIMENT

Embodiments of the present invention will be described with reference to the drawings. Incidentally, the same parts and portions as those in the background-art example are referenced correspondingly.

First Embodiment

Figure 1:
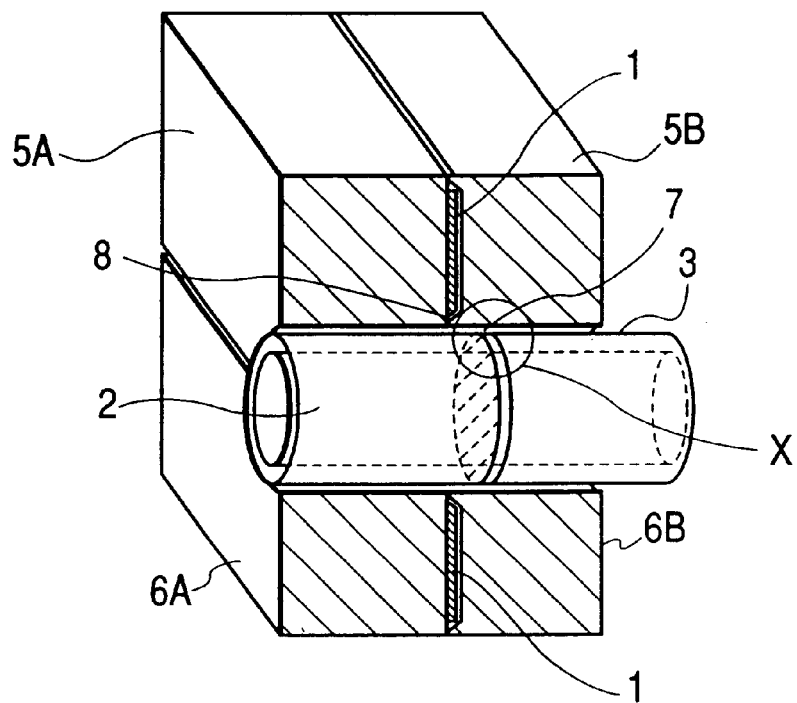
FIG. 1 is a partially sectional perspective view showing an apparatus for use in a bonding method according to a first embodiment of the present invention.

Description will be made about a bonding method according to a first embodiment of the present invention with reference to FIGS. 1 and 2. This bonding method is performed in accordance with the following procedure.

(1) First, an abutment plate (not shown) is disposed as a partition between lower molds 6A and 6B in the state where left and right split molds 5 and 6 are split from each other. Then, two extrusion-molded pieces 2 and 3 which have been cut precisely at right angles with the surfaces thereof and which have hollow portions with the same sectional shape (which is annular here), are set to look at the inside of each other on the lower molds 6A and 6B. Thus, the end surfaces of the molded pieces 2 and 3 to be bonded with each other abut against the abutment plate from left and right. Here, the extrusion-molded piece 2 is set in the upper portion of the lower mold 6A and, similarly, the extrusion-molded piece 3 is set in the upper portion of the lower mold 6B. The distance between both the extrusion-molded pieces 2 and 3 is defined by the abutment plate. Then, the upper molds 5A and 5B are moved down and the molds are closed so as to clamp the extrusion-molded pieces 2 and 3 from the top and bottom thereof. Thus, the extrusion-molded pieces 2 and 3 are held firmly.

The mold 5 is constituted by the upper molds 5A and 5B and the mold 6 is constituted by the lower molds 6A and 6B. The molds 5 and 6 are split so that the upper mold 5A and the lower mold 6A are moved to the left while the upper mold 5B and the lower mold 6B are moved to the right. A cutting blade 7 and a cutting blade bearing portion 8 are formed in the molds 5 and 6, respectively. The cutting blade 7 is formed along the outer circumferential surface of the extrusion-molded piece 3 in the left end surfaces of the right molds 5B and 6B. The blade bearing portion 8 is formed along the outer circumferential surface of the extrusion-molded piece 2 in the right end surfaces of the left molds 5A and 6A.

(2) Next, the left molds 5A and 6A and the right molds 5B and 6B are made to leave each other. In place of the abutment plate, a sheet material 1 acting as a bonding medium is inserted between the left molds 5A and 6B and the right molds 5B and 6B by a sheet material setting mechanism (not shown).

Incidentally, various combinations can be considered as the materials of the extrusion-molded pieces 2 and 3 and the sheet material 1. For example, both the materials may be EPDM (either solid or sponge), or may be a thermoplastic olefin (TPO). Alternatively, only the extrusion-molded piece 2 may be of TPO while the other extrusion-molded piece 3 and the sheet material 1 are of EPDM; only the extrusion-molded piece 2 may be of cross-linked thermoplastic vulcanizate (TPV) while the other extrusion-molded piece 3 and the sheet material 1 are of TPO; or only the sheet material 1 may be of TPV while the extrusion-molded pieces 2 and 3 are of TPO.

Further, the sheet material 1 is not always of a single layer, but may have two layers on the upper and lower sides (for example, the upper half is of EPDM and the lower half is of TPO), or may have two layers on the left and right sides (for example, the left half is of EPDM and the right half is of TPO).

(3) Next, the left molds 5A and 6A and the right molds 5B and 6B apart from each other are made close to each other, and the left and right split molds 5 and 6 are attached with each other so that the end surfaces 2a and 3a of the extrusion-molded pieces 2 and 3 to be bonded with each other are made to abut against each other. Then, the extrusion-molded pieces 2 and 3 are heat-vulcanized. Since the left and right molds 5 and 6 are attached with each other in this way, the sheet material 1 is cut, by the cutting blade 7 and the blade bearing portion 8, into a shape (here, a circular shape) corresponding to the shapes of the end surfaces of the extrusion-molded pieces 2 and 3 to be bonded with each other. Then, the sheet material 1 and the extrusion-molded pieces 2 and 3 are thermally processed (here, heat-vulcanized by way of example) so as to be bonded integrally with one another. Incidentally, although the heat-vulcanizing method was used as the thermally processing method in this embodiment, there may be adopted a method in which connecting end portions are heated in advance and thermally fused with each other when they are connected to each other.

(4) Then, the mold clamping pressure with which the upper molds 5A and 5B and the lower molds 6A and 6B clamp the extrusion-molded pieces 2 and 3 integrated with each other is released slightly. The extrusion-molded pieces 2 and 3 integrated with each other are slid and moved to either left or right with respect to the molds (slid and moved to the right in this embodiment as shown in FIG. 1), and the molds 5 and 6 are closed again.

Figure 2:
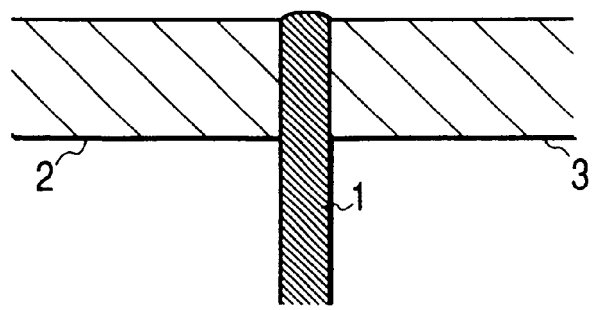
FIG. 2 is an enlarged sectional view of a portion X shown in FIG. 1.

By sliding and moving the extrusion-molded pieces 2 and 3 in this way, any burr produced in the outer circumference of the sheet material 1 before sliding and moving is leveled by plane portions of the molds 5 and 6 before the burr is solidified, as shown in FIG. 2.

The reason why the molds are released slightly from clamping the extrusion-molded pieces 2 and 3 integrated with each other before the extrusion-molded pieces 2 and 3 are slid and moved is to make the sliding and moving of the extrusion-molded pieces 2 and 3 smooth. Further, the reason why the molds are closed again after the extrusion-molded pieces 2 and 3 have been slid and moved is to level the produced burrs surely.

(5) Then, the left molds 5A and 6A and the right molds 5B and 6B are made to leave each other. Further, the upper molds 5A and 5B are made to come off from the lower molds 6A and 6B respectively, and the sheet material 1 and the extrusion-molded pieces 2 and 3 molded integrally are taken out from the molds. At this time, tailings (unnecessary sheet material) of the cut sheet material 1 are removed by the function of the cutting blade 7 and the blade bearing portion 8.

Thus, the bonding of the extrusion-molded pieces 2 and 3 is completed.

As described above, after the molds have been integrated with each other, the extrusion-molded pieces 2 and 3 are slid and moved so that any burr of the sheet material 1 formed in the end portions of the extrusion-molded pieces 2 and 3 to be bonded with each other is leveled. Accordingly, there is no fear that a water-stop seal function is blocked when the extrusion-molded pieces 2 and 3 integrated with each other are used as the seal material of an automotive weather strip or the like. In addition, because all the burrs are leveled, the appearance of the integrated extrusion-molded pieces 2 and 3 becomes excellent.

Figure 3:
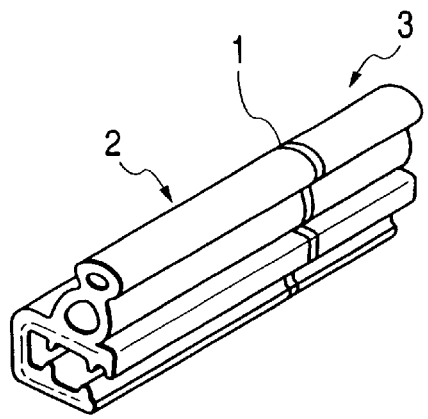
FIG. 3 is a perspective view showing an example of extrusion-molded pieces bonded with each other.
Figure 4A:
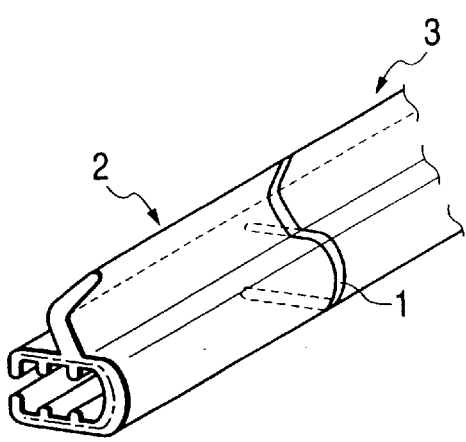
FIGS. 4(a) and (b) are perspectives view showing other examples of extrusion-molded pieces bonded with each other.
Figure 5:
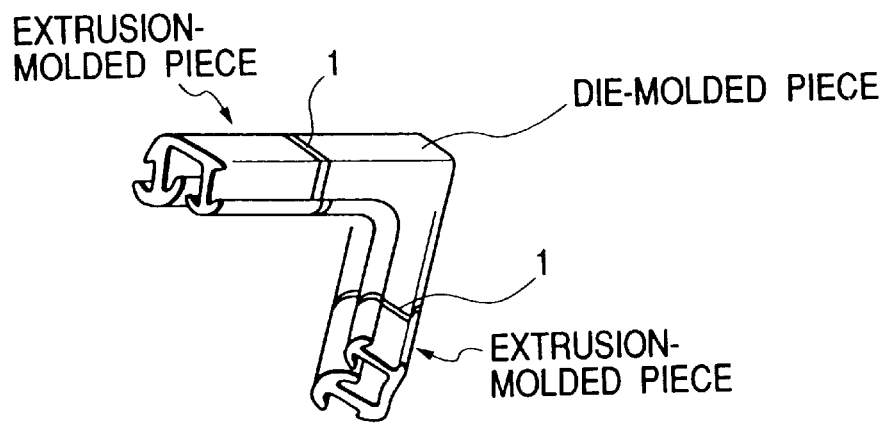
FIG. 5 is a perspective view showing an example of glass runs bonded with each other.
Figure 6:
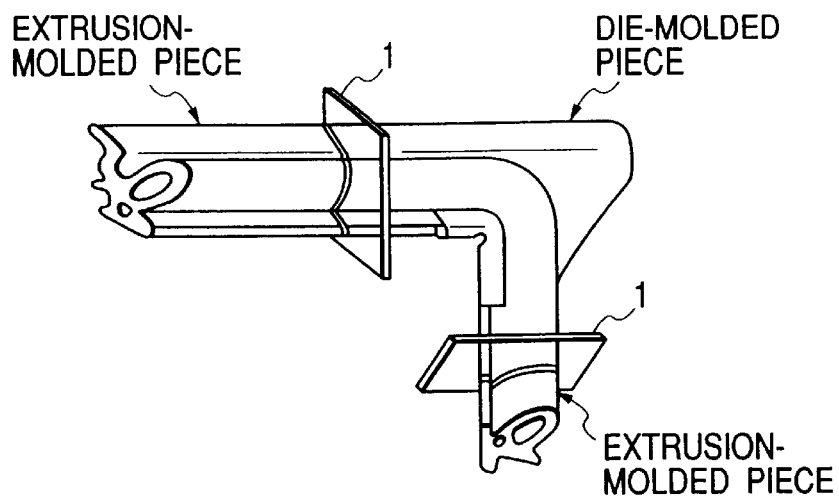
FIG. 6 is a perspective view showing an example of door outer seal materials bonded with each other.
Figure 7:
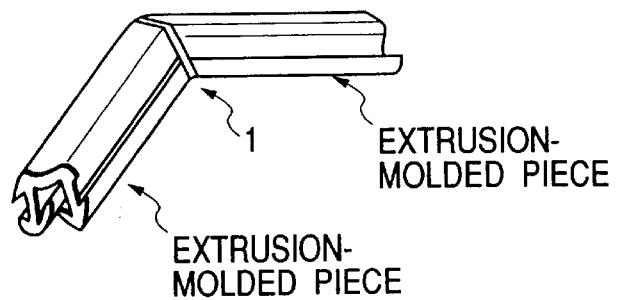
FIG. 7 is a perspective view showing another example of glass runs bonded with each other.
Figure 8:
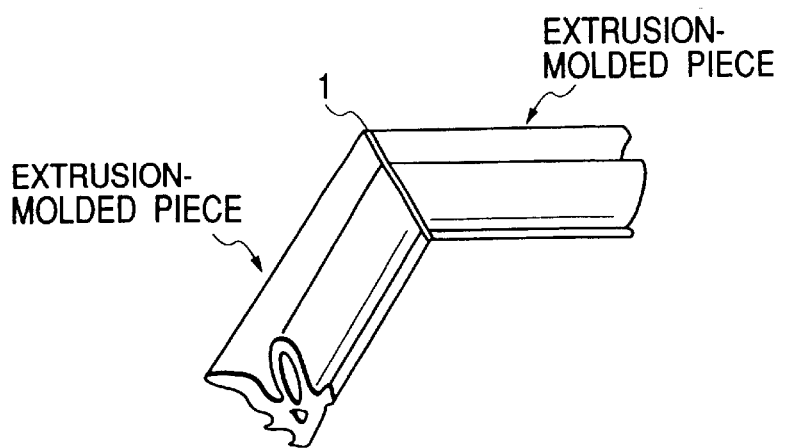
FIG. 8 is a perspective view showing another example of door outer seal materials bonded with each other.

Although the extrusion-molded pieces 2 and 3 to be integrated with each other are made annular (columnar) in section in the first embodiment, the present invention is applicable also to extrusion-molded pieces each having hollow portions partially (the number of hollow portion(s) may be one or more) and to be used as an automotive weather strip, or the like, as shown in FIG. 3. In addition, the present invention is applicable also to extrusion-molded pieces having no particular hollow portion as shown in FIGS. 4(a) and (b). Further, the present invention is not limited to such application to connecting two extrusion-molded pieces with each other, but may be applied to connecting two die-molded pieces with each other, or to connecting an end portion of an extrusion-molded piece and an end portion of a die-molded piece with each other, such as an automotive glass run as shown in FIG. 5, a door outer seal material as shown in FIG. 6, or the like. In addition, so long as the end portions of the molded pieces to be connected with each other have the same sectional shape, the present invention is not limited to application to connecting molded-pieces with each other linearly, but may be applied to connecting molded-pieces to form a certain angle through oblique connection surfaces to form various products such as a glass run obtained by connecting extrusion-molded pieces with each other as shown in FIG. 7, a door outer seal material obtained by similarly connecting extrusion-molded pieces as shown in FIG. 8.

Although the extrusion-molded pieces 2 and 3 integrated with each other are slid and moved relatively to the molds 5 and 6 in the first embodiment, conversely, the molds 5 and 6 as a whole may be slid and moved relatively to the integrated extrusion-molded pieces 2 and 3.

Alternatively, the molds 5 and 6 may be slid and moved not wholly but partially.

Figure 9:
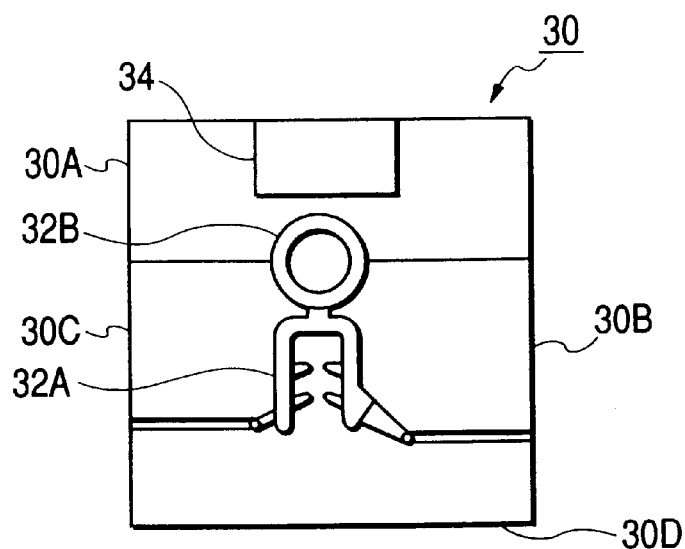
FIG. 9 is a side view showing an apparatus for use in another bonding method according to the first embodiment of the present invention.
Figure 10:
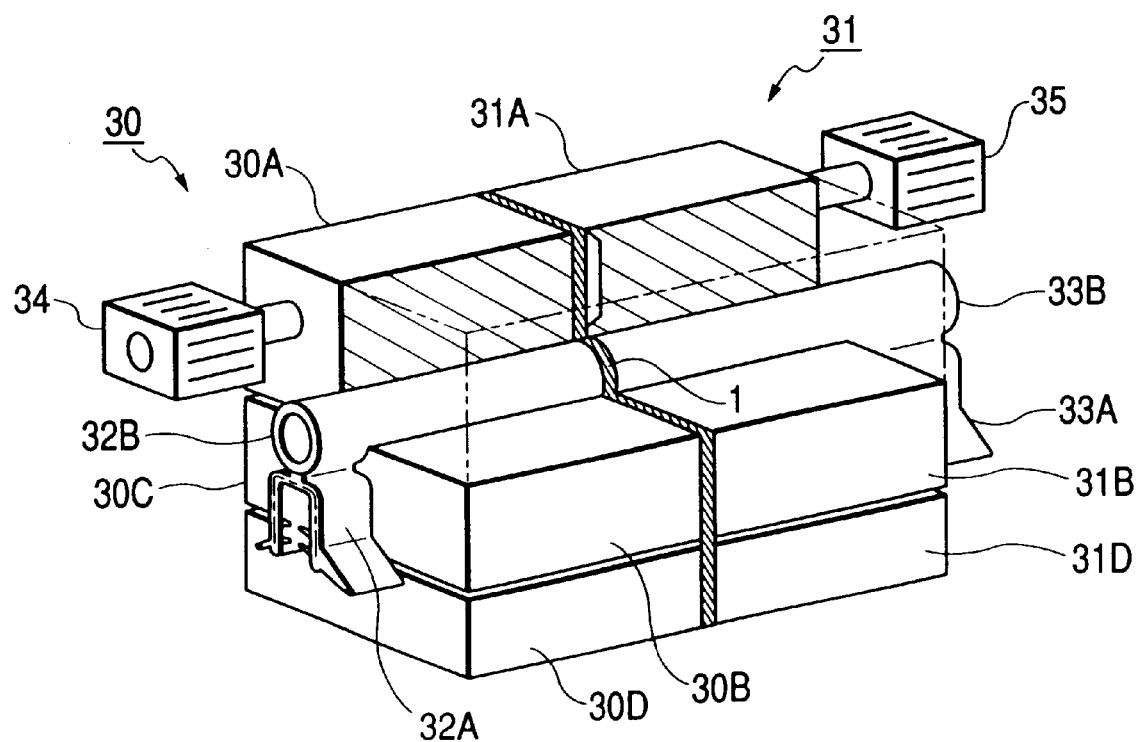
FIG. 10 is a partially sectional perspective view showing the apparatus in FIG. 9.
Figure 11:
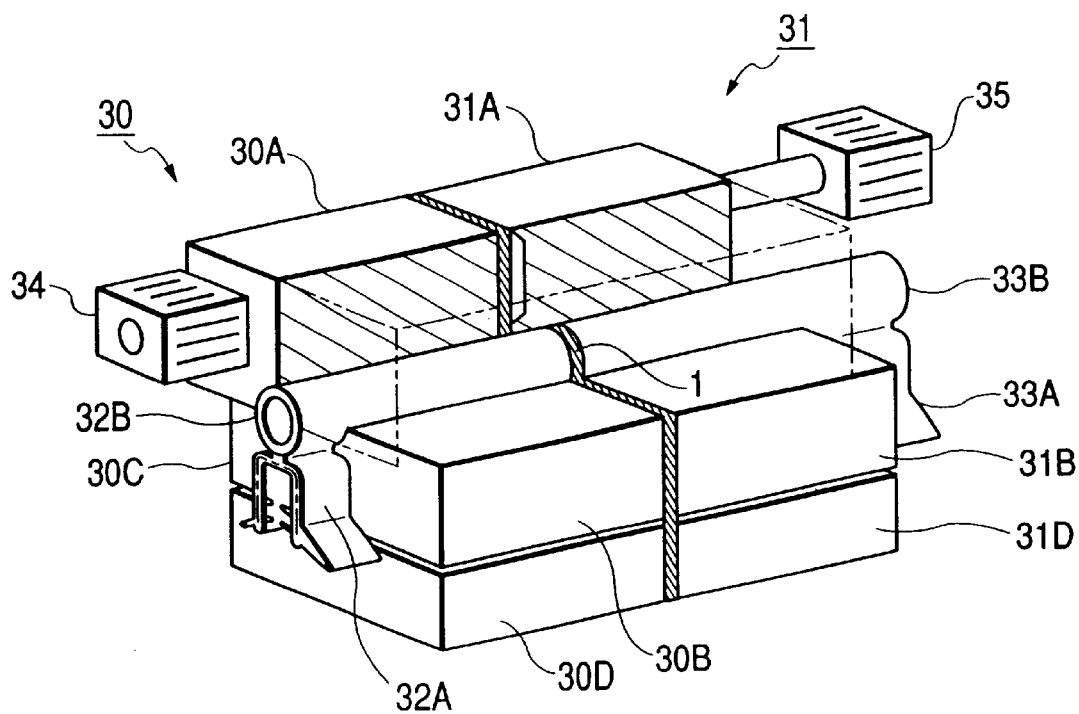
FIG. 11 is a partially sectional perspective view showing the apparatus in FIG. 10, in which molds have been moved partially.

That is, as shown in FIGS. 9 to 11, left and right split molds 30 and 31 may be arranged to be split into two or more (here, split into four, respectively, that is, upper molds 30A and 31A, first middle molds 30B and 31B, second middle molds 30C and 31C, and lower molds 30D and 31D) vertically so that only the upper molds 30A and 31A may be slid and moved to left from the state of FIG. 10 to the state of FIG. 11. Driving cylinders 34 and 35 are attached to the upper molds 30A and 31A respectively so that the upper molds 30A and 31A can be slid and moved by the operation of the driving cylinders 34 and 35 respectively.

According to this arrangement, any burr produced not in the whole of the molded pieces but only in necessary portions thereof, here particularly in hollow seal portions 32B and 33B molded integrally with attachment base portions 32A and 33A respectively where burr may affect a seal function directly, can be removed in concentration by sliding and moving the upper molds 30A and 31A which abut against the hollow seal portions 32B and 33B respectively.

Figure 12:
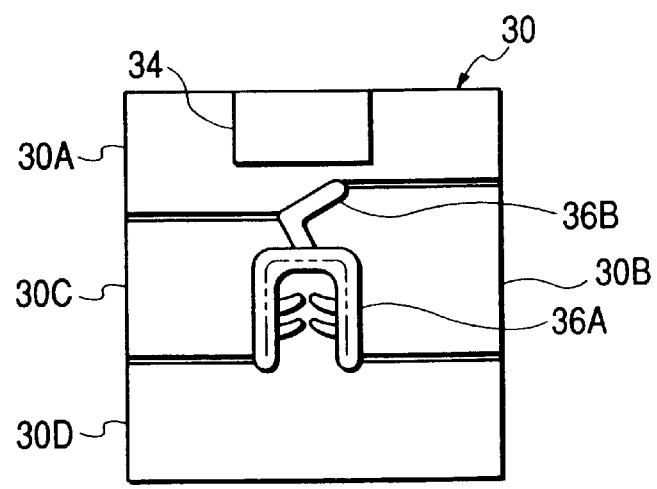
FIG. 12 is a side view showing an apparatus for use in a further other bonding method according to the first embodiment of the present invention.
Figure 13:
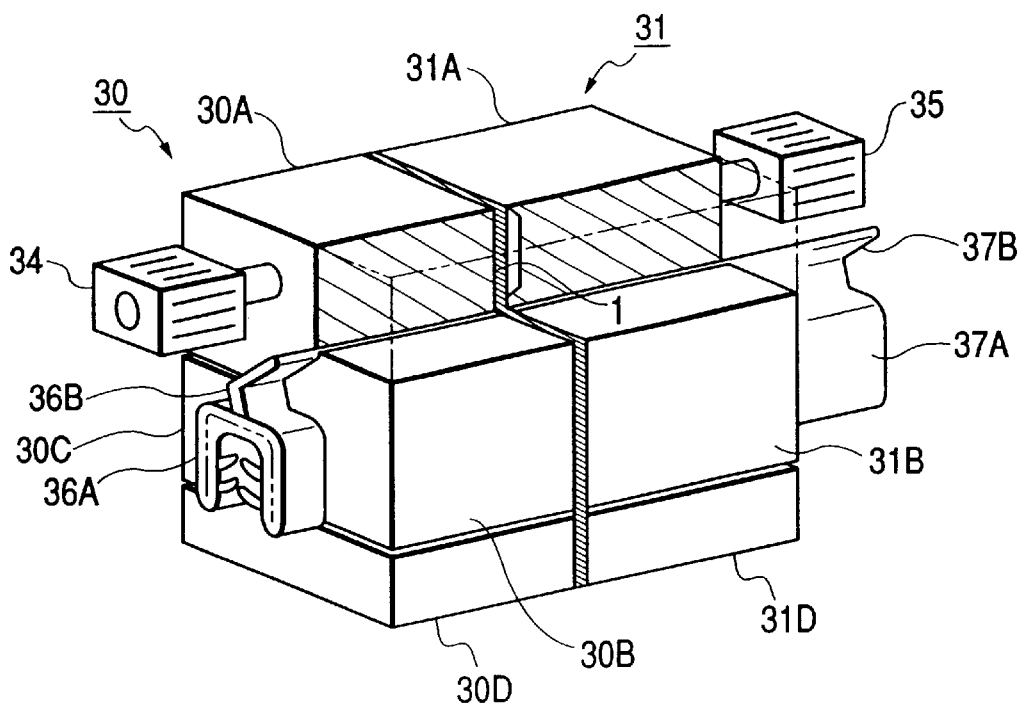
FIG. 13 is a partially sectional perspective view showing the apparatus in FIG. 12.
Figure 14:
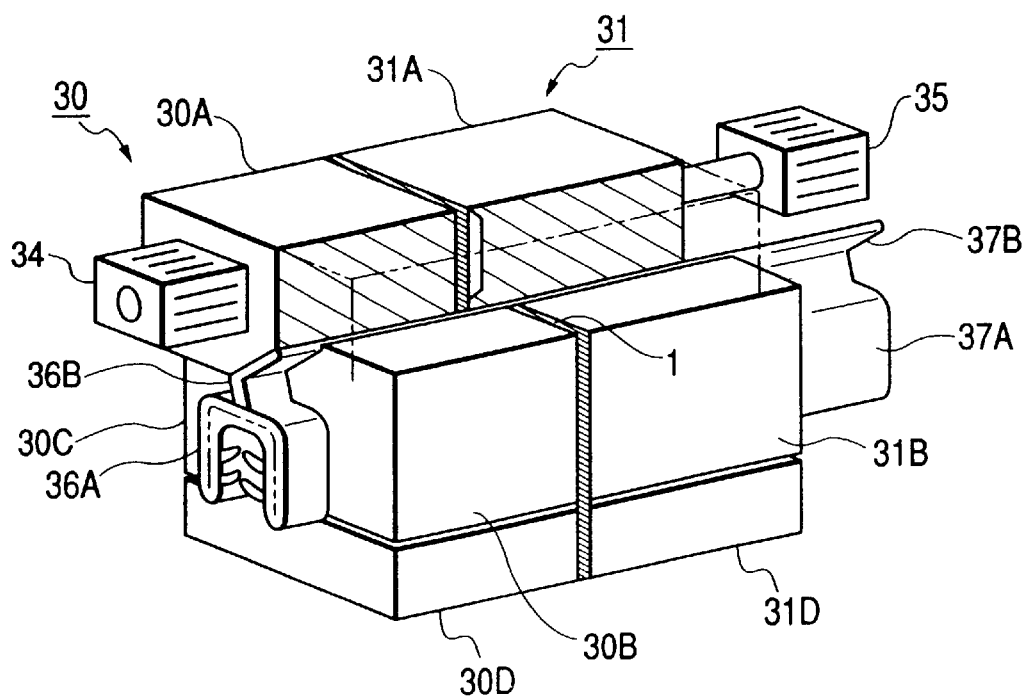
FIG. 14 is a partially sectional perspective view showing the apparatus in FIG. 13, in which molds have been moved partially.

Further, as shown in FIGS. 12 to 14, if the shapes of the upper molds 30A and 31A are modified, this arrangement can be applied also to seal portions 36B and 37B of lip portions molded integrally with attachment base portions 36A and 37A respectively.

Second Embodiment

Figure 15:
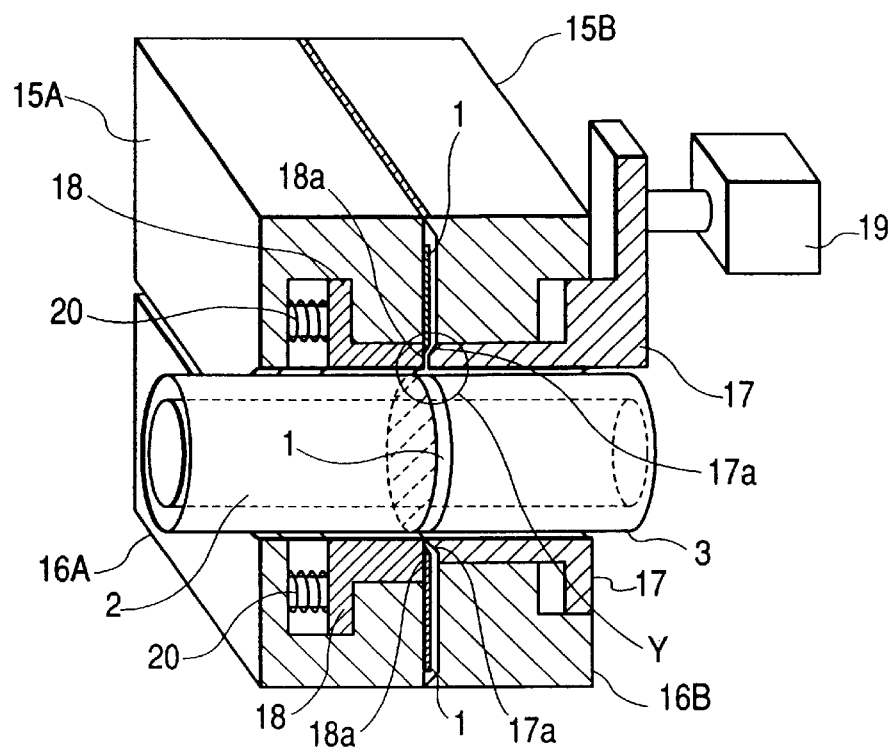
FIG. 15 is a partially sectional perspective view showing an apparatus for use in a bonding method according to a second embodiment of the present invention.

Next, description will be made about a bonding method according to a second embodiment of the present invention with reference to FIGS. 15 to 17. Incidentally, the same parts and portions as those in the first embodiment are referenced correspondingly.

A bonding apparatus (FIG. 15) for use in this bonding method is different from the above-mentioned bonding apparatus (FIG. 1) used in the first embodiment.

The bonding apparatus for use in the second embodiment is similar to the bonding apparatus of the first embodiment in the points that also the former has upper and lower molds 15 and 16 which can be split into left split molds 15A and 16A and right split molds 15B and 16B in which two extrusion-molded pieces 2 and 3 having hollow portions with the same sectional shape can be set to look at the insides of each other so that the respective end surfaces 2a and 3a of the extrusion-molded pieces 2 and 3 to be bonded with each other face each other; and a not-shown sheet material setting mechanism for inserting a sheet material 1 between the left molds 15A and 16A and the right molds 15B and 16B. However, the former is different from the latter in that the upper and lower molds 15 and 16 are provided with a sliding blade portion 17 which can move to left and right, a sliding blade bearing portion 18 which bears the sliding blade portion 17 and which can move to left and right in the same manner, a driving cylinder 19 which is a driving mechanism for moving the sliding blade portion 17 to left and right, and a spring member 20.

The sliding blade portion 17 has a cutting blade 17a provided at its front end for cutting the sheet material 1 along the shapes of the end surfaces 2a and 3a to be bonded of the extrusion-molded pieces 2 and 3 set in the molds 15 and 16 respectively. The cutting blade 17a is formed along the outer circumferential surface of the extrusion-molded piece 3 and on the left side of the right molds 15B and 16B. The shape of the cutting blade 17a is similar to that of the cutting blade 7 shown in the first embodiment. In addition, the sliding blade portion 17 is fitted into the inside of the right molds 15B and 16B so as to be slidable to left and right. The driving cylinder 19 is connected to the sliding blade portion 17.

The sliding blade bearing portion 18 has a blade bearing portion 18a provided at its front end for bearing the cutting blade 17a. The blade bearing portion 18a is formed along the outer circumferential surface of the extrusion-molded piece 2 and on the right side of the left molds 15A and 16A. The shape of the blade bearing portion 18a is similar to that of the blade bearing portion 8 shown in the first embodiment. The left end of the sliding blade bearing portion 18 is fitted into the inside of the left molds 15A and 16A through the spring member 20 so that the sliding blade bearing portion 18 can slide to left and right. The spring member 20 urges the sliding blade bearing portion 18 rightward.

Thus, when the sliding blade portion 17 is moved to left by the operation of the driving cylinder 19 so as to abut against the sliding blade bearing portion 18, the sliding blade portion 17 and the sliding blade bearing portion 18 slide and move together to left inside the molds 15 and 16. At this time, the spring member 20 is in contraction. On the contrary, when the sliding blade portion 17 is moved to right by the operation of the driving cylinder 19, the spring member 20 extends. By the restoring force of the spring member 20, the sliding blade portion 17 and the sliding blade bearing portion 18 slide and move together to right inside the molds 15 and 16.

The bonding method according to the second embodiment using the aforementioned bonding apparatus is carried out in accordance with the following procedure.

(1) After the sheet material 1 is disposed between the extrusion-molded pieces 2 and 3, the left molds 15A and 16A and the right molds 15B and 16B apart from each other are made close to each other, and the left and right split molds 15 and 16 are attached with each other and thermally processed (a heat vulcanization method is adopted here, but it may be replaced by heat-sealing) while the end portions 2a and 3a of the extrusion-molded pieces 2 and 3 abut against each other. The process up to here is similar to the process in the steps (1) to (3) described in the first embodiment, and the description thereof is omitted.

(2) Next, the mold clamping pressure with which the upper molds 15A and 15B and the lower molds 16A and 16B clamp the extrusion-molded pieces 2 and 3 integrated with each other is released slightly. The driving cylinder 19 is operated to drive the sliding blade portion 17 and the sliding blade bearing portion 18 to slide and move to left together. The molds 15 and 16 are closed again.

Figure 16:
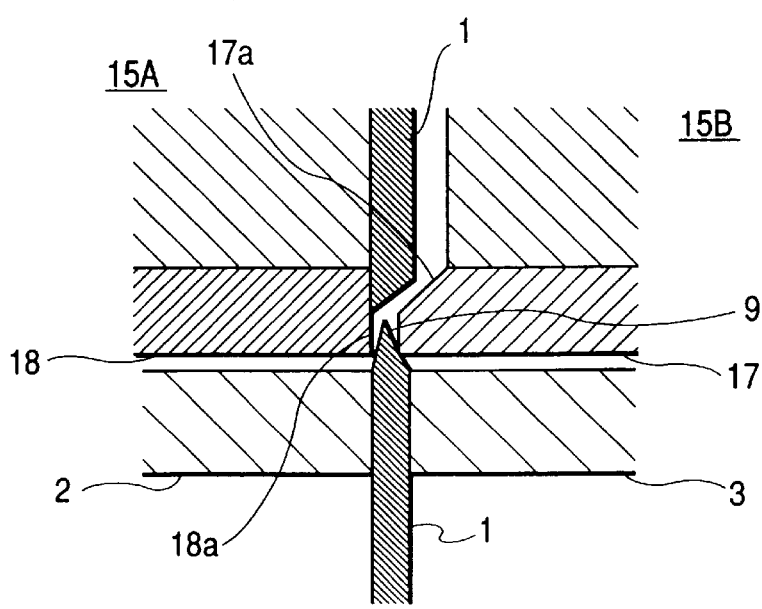
FIG. 16 is an enlarged sectional view of a portion Y in FIG. 15, showing the state where a seal material has not been cut yet.
Figure 17:
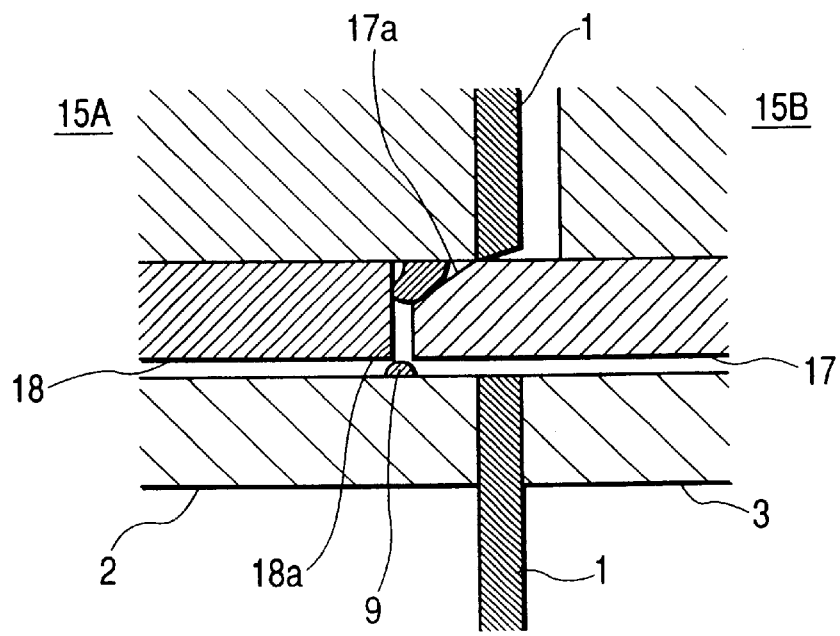
FIG. 17 is an enlarged sectional view of the portion Y in FIG. 15, showing the state where the seal material has been cut.

By the sliding and moving of the sliding blade portion 17 and the sliding blade bearing portion 18 together in such a manner as described above, any burr 9 produced in the outer circumference of the sheet material 1 before sliding and moving as shown in FIG. 16 is cut and leveled by plane portions of the sliding blade portion 17 before the burr 9 is solidified, as shown in FIG. 17.

The reason why the molds are released slightly from clamping the extrusion-molded pieces 2 and 3 integrated with each other before the sliding blade portion 17 and the sliding blade bearing portion 18 are slid and moved is to slide and move the sliding blade portion 17 and the sliding blade bearing portion 18 smoothly. The reason why the molds are closed again after the sliding blade portion 17 and the sliding blade bearing portion 18 are slid and moved is to level the produced burrs surely.

(3) Then, the left molds 15A and 16A and the right molds 15B and 16B are made to leave each other. Further, the upper molds 15A and 15B are made to come off from she lower molds 16A and 16B respectively, and the sheet material 1 and the extrusion-molded pieces 2 and 3 molded integrally are taken out from the molds. Then, when the driving cylinder 19 is operated to drive the sliding blade portion 17 to move right, the sliding blade bearing portion 18 is also moved to right by the pressing force of the spring member 20. Thus, the sliding blade bearing portion 18 restores its initial state. Then, tailings (unnecessary sheet material) of the cut sheet material 1 are removed.

Thus, the bonding of the extrusion-molded pieces 2 and 3 is completed.

As has been described, by sliding and moving the sliding blade portion 17, any burr of the sheet material 1 formed in the bonded end portions of the extrusion-molded pieces 2 and 3 is leveled. Accordingly, an effect similar to that in the first embodiment can be obtained.

Figure 4B:
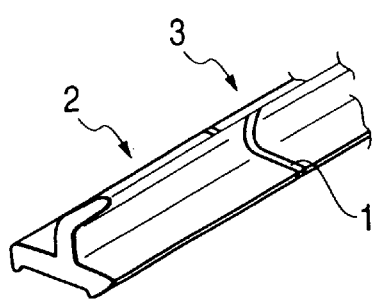

Although the extrusion-molded pieces 2 and 3 to be integrated with each other are made annular (columnar) in section in the second embodiment, the present invention is applicable also to extrusion-molded pieces (FIG. 3) having hollow portions partially (the number of hollow portions may be one or more) and used as an automotive weather strip, or extrusion-molded pieces (FIG. 4) having no particular hollow portion, in the same manner as in the first embodiment. Further, the present invention may be applied to connecting two die-molded pieces with each other, or to the cases (FIGS. 5 and 6) of connecting an end portion of an extrusion-molded piece and an end portion of a die-molded piece with each other, such as an automotive glass run, a door outer seal material, or the like. In addition, the present invention may be applied to connecting molded-pieces non-linearly (FIGS. 7 and 8).

Although the cutting blade 17a and the blade bearing portion 18a for bearing the cutting blade 17a, which are formed along the whole (whole circumference) of the outer circumferential surfaces of the extrusion-molded pieces 2 and 3, are slid and moved in the second embodiment, the portion along the outer circumferential surfaces of the extrusion-molded pieces 2 and 3 may be moved partially.

Figure 18:
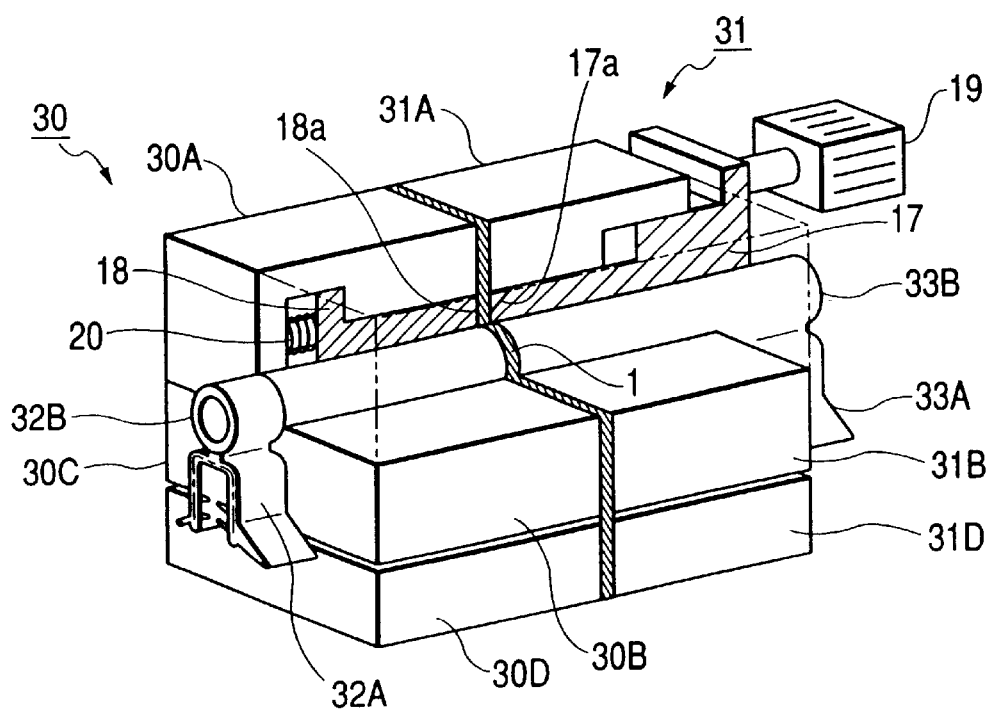
FIG. 18 is a partially sectional perspective view showing an apparatus for use in another bonding method according to the second embodiment of the present invention.
Figure 19:
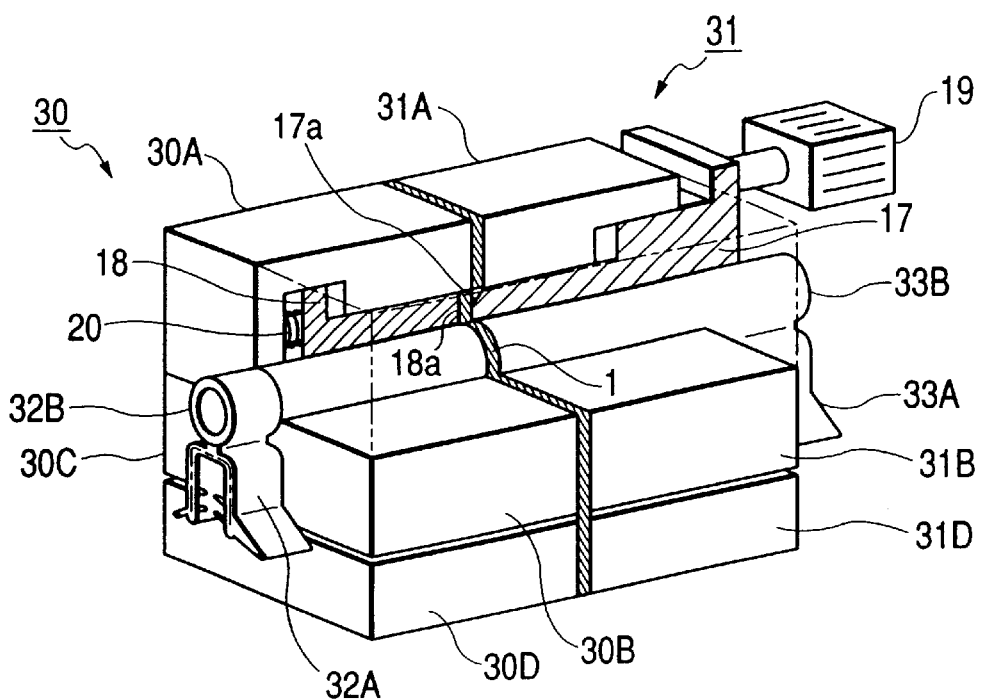
FIG. 19 is a partially sectional perspective view showing the apparatus in FIG. 18, in which a sliding blade portion and sliding blade bearing portion formed partially have been moved.

That is, as shown in FIGS. 18 and 19, the sliding blade portion 17 having the cutting blade 17a which can move may be provided in only the upper mold 31A while the sliding blade bearing portion 18 having the blade bearing portion 18a for bearing the cutting blade 17a is provided in only in the upper mold 30A.

According to this arrangement, any burr produced not in the whole of the molded pieces but in necessary portions thereof, here particularly in hollow seal portions 32B and 33B molded integrally with attachment base portions 32A and 33A respectively where burr may affect a seal function directly, can be removed in concentration by the sliding and moving of the sliding blade portion 17 and the sliding blade bearing portion 18 formed in the upper molds 30A and 31A which abut against the hollow seal portions 32B and 33B respectively.

Figure 20:
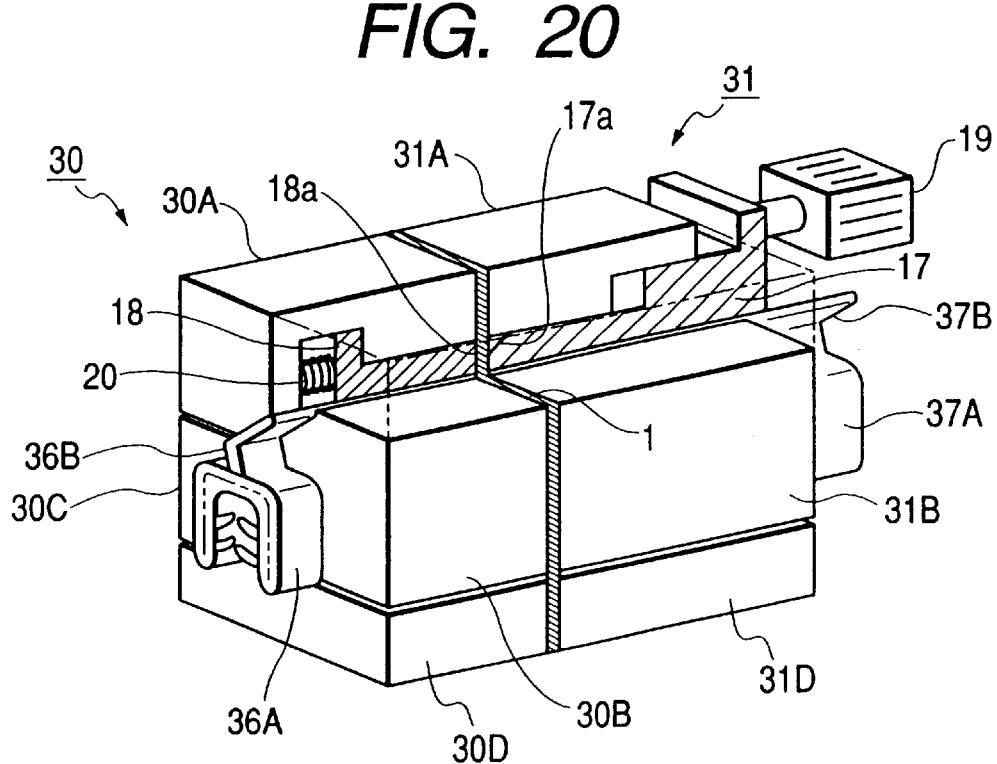
FIG. 20 is a partially sectional perspective view showing an apparatus for use in a further other bonding method according to the second embodiment of the present invention.
Figure 21:
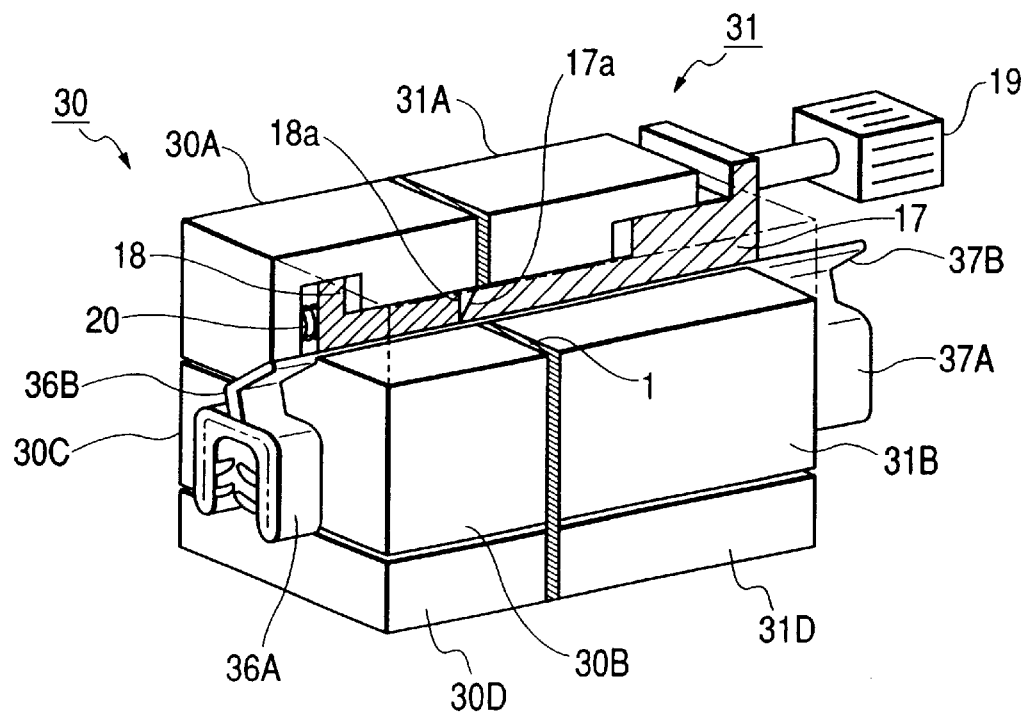
FIG. 21 is a partially sectional perspective view showing the apparatus in FIG. 20, in which a sliding blade portion and sliding blade bearing portion formed partially have been moved.
Figure 22:
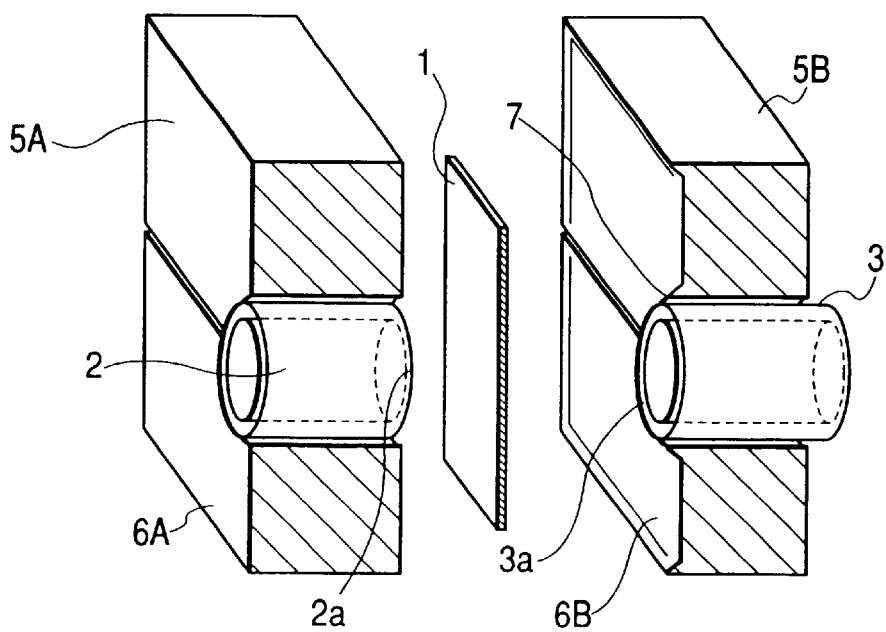
FIG. 22 is a partially sectional perspective view showing an apparatus for use in a bonding method according to the background art, illustrating the state where extrusion-molded pieces have not been bonded with each other yet.
Figure 23:
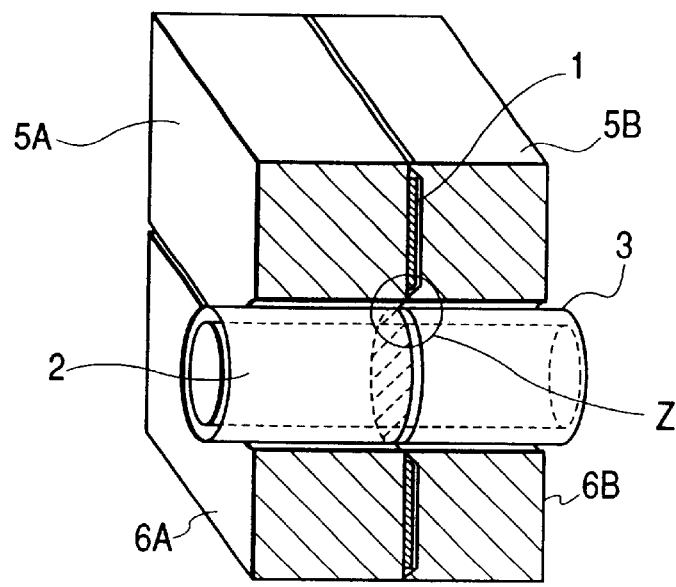
FIG. 23 is a partially sectional perspective view showing the apparatus for use in the bonding method according to the background art, illustrating the state where the extrusion-molded pieces have been bonded with each other.
Figure 24:
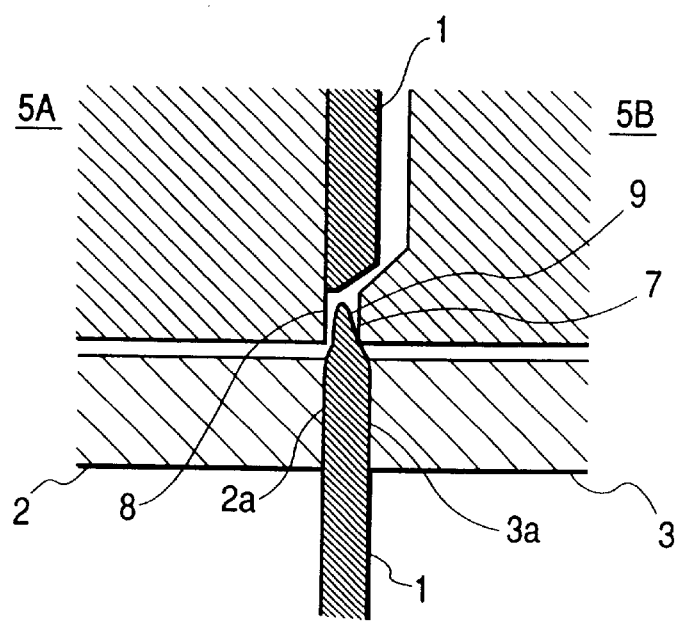
FIG. 24 is an enlarged sectional view of a portion Z shown in FIG. 23.

Further, as shown in FIGS. 20 to 21, if the shapes of the upper molds 30A and 31A are modified, this arrangement can be applied also to seal lip portions 36B and 37B molded integrally with attachment base portions 36A and 37A respectively.

As has been described, according to the present invention, any burr of a sheet material produced in the outer circumferential surfaces of extrusion-molded pieces (which may be replaced by two die-molded pieces or a combination of an extrusion-molded piece and a die-molded piece) is leveled or cut so as to be removed therefrom when the molds are made to abut against each other so as to be integrated with each other. Accordingly, the appearance of the integrated molded pieces becomes excellent.

In addition, when the integrated molded pieces are used as a seal material such as an automotive weather strip or the like, there is no fear that a seal function is blocked.

Particularly according to the invention stated in items (3) and (6) above, a pair of cutting blade and blade bearing portion for cutting burrs are provided inside the molds, so that the apparatus as a whole can be made compact to save a space.

According to the invention stated in items (2) and (4) above, sliding and moving is performed upon the molded pieces not wholly but partially, so that burrs can be removed (leveled) in concentration only in a portion in which burrs are apt to be produced.

According to item (5) above, the molds are released slightly from clamping the integrated molded pieces before the sliding and moving, the molded pieces, the molds or the cutting blade can be slid and moved smoothly. In addition, after such sliding and moving, the molds are closed again. Accordingly, any produced burr is leveled surely.

While the invention has been described in detail and with reference to specific embodiments thereof, it will be apparent to one skilled in the art that various changes and modifications can be made therein without departing from the sprit and scope thereof.

What is claimed is:

1. A method for bonding molded pieces, comprising the steps of:

providing a mold which can be split into left and right molds, said right mold having a cutting blade formed on a left side thereof so as to be along outer circumferential surfaces of the molded pieces, and said left mold having a blade bearing portion formed on a right side thereof for bearing said cutting blade;

setting a pair of molded pieces having sectional shapes coincident with each other into said left and right molds, respectively, in such a manner that end surfaces of said molded pieces to be bonded are put inside so as to face each other, wherein said pair of molded pieces each individually being an extrusion-molded piece or a die-molded piece;

attaching said left and right split molds with each other while inserting a sheet material acting as a bonding medium therebetween, so that said end portions of said molded pieces to be bonded are brought into contact with each other through said sheet material, and that said sheet material is cut into a shape along the shape of said molded piece end surfaces by said cutting blade;

applying heat to at least a portion of said molded pieces to integrate with each other; and sliding at least one of said molds and said integrated molded article to move left or right such that any burr of said sheet material produced by said integration is leveled.

2. The method for bonding molded pieces according to claim 1, wherein said mold, which can be split into left and right molds, can be further split into two or more molds in the vertical direction, and said sliding step is carried out by sliding at least each one of said vertically split molds of said left and right molds.

3. A method for bonding molded pieces, comprising the steps of:

provided a mold which can be split into left and right molds, said right mold having a cutting blade formed on a left side thereof so as to be along outer circumferential surfaces of the molded pieces, said left mold having a blade bearing portion formed on a right side thereof for bearing said cutting blade, and said cutting blade and said blade bearing portion being movable left and right independently of said molds;

setting a pair of molded pieces having sectional shapes coincident with each other into said left and right molds, respectively, in such a manner that end surfaces of said molded pieces to be bonded are put inside so as to face each other, wherein said pair of molded pieces each individually being an extrusion-molded piece or a die-molded piece;

attaching said left and right split molds with each other while inserting a sheet material acting as a bonding medium therebetween, so that said end portions of said molded pieces to be bonded are brought into contact with each other through said sheet material, and that said sheet material is cut into a shape along the shape of said molded piece end surfaces by said cutting blade;

applying heat to at least a portion of said molded pieces to integrate with each other; and sliding said cutting blade and said blade bearing portion to move left such that any burr of said sheet material produced during said integration is leveled.

4. The method for bonding molded pieces according to claim 3, wherein only a part of said cutting blade and said blade bearing portion each along the outer circumferential surfaces of said molded pieces is made movable.

5. The method for bonding molded pieces according to claim 1, further comprising:

slightly releasing a clamping force of said molds with respect to said integrated molded article, prior to said sliding step; and tightening said molds after said sliding step.

6. The method for bonding molded pieces according to claim 2, further comprising:

slightly releasing a clamping force of said molds with respect to said integrated molded article, prior to said sliding step; and tightening said molds after said sliding step.

7. The method for bonding molded pieces according to claim 3, further comprising:

slightly releasing a clamping force of said molds with respect to said integrated molded article, prior to said sliding step; and tightening said molds after said sliding step.

8. The method for bonding molded pieces according to claim 4, further comprising:

slightly releasing a clamping force of said molds with respect to said integrated molded article, prior to said sliding step; and tightening said molds after said sliding step.

9. An apparatus for bonding molded pieces, comprising:

a mold which can be split into left and right molds adapted so that a pair of molded pieces to be bonded having sectional shapes coincident with each other can be respectively set therein with end surfaces of said molded pieces to be bonded being put inside so as to face each other;

a sheet material setting mechanism for inserting a sheet material acting as a bonding medium between said left and right molds;

a sliding blade portion which has a cutting blade disposed at a front end thereof for cutting said sheet material along shapes of end surfaces of said molded pieces to be bonded and set in said molds, said cutting blade being formed so as to be along outer circumferential surfaces of said molded pieces on a left side of said right mold, and said sliding blade portion being movable to left and right inside said right mold;

a driving mechanism for moving said sliding blade portion to left and right;

a sliding blade bearing portion which has a blade bearing portion at a front end thereof for bearing said cutting blade, said blade bearing portion being formed on a right side of said left mold so that said blade bearing portion, and said sliding blade bearing portion being movable to left and right inside said left mold; and a spring member for pressing said sliding blade bearing portion to right.

* * * * *

UNITED STATES PATENT AND TRADEMARK OFFICE
CERTIFICATE OF CORRECTION

PATENT NO.    : 6,616,878 B2
DATED         : September 9, 2003
INVENTOR(S)   : Fumio Harada et al.

It is certified that error appears in the above-identified patent and that said Letters Patent is hereby corrected as shown below:

<u>Title page,</u>
Item [*] Notice, should read as follows:
-- [*] Notice:   Subject to any disclaimer, the term of this patent is extended or adjusted under 35 U.S.C. 154(b) by 347 days. --.

Signed and Sealed this

Tenth Day of February, 2004

JON W. DUDAS
*Acting Director of the United States Patent and Trademark Office*